United States Patent
Zhang et al.

(10) Patent No.: US 9,627,990 B2
(45) Date of Patent: Apr. 18, 2017

(54) NON-ISOLATED SYMMETRIC SELF-COUPLING 18-PULSE RECTIFIER POWER SUPPLY SYSTEM

(71) Applicant: GUANGDONG EAST POWER CO., LTD., Dongguan, Guangdong (CN)

(72) Inventors: Shengfa Zhang, Guangdong (CN); Haibo Xu, Guangdong (CN); Zhaoyang Tang, Guangdong (CN); Peng Li, Guangdong (CN)

(73) Assignee: GUANGDONG EAST POWER CO., LTD., Dongguan (CN)

( * ) Notice: Subject to any disclaimer, the term of this patent is extended or adjusted under 35 U.S.C. 154(b) by 0 days.

(21) Appl. No.: 14/395,136

(22) PCT Filed: Sep. 27, 2012

(86) PCT No.: PCT/CN2012/082211
§ 371 (c)(1),
(2) Date: Oct. 17, 2014

(87) PCT Pub. No.: WO2013/155820
PCT Pub. Date: Oct. 24, 2013

(65) Prior Publication Data
US 2015/0078045 A1    Mar. 19, 2015

(30) Foreign Application Priority Data
Apr. 20, 2012 (CN) .......................... 2012 1 0117735

(51) Int. Cl.
*H02M 7/06* (2006.01)
*H02M 1/14* (2006.01)
(Continued)

(52) U.S. Cl.
CPC ............. *H02M 7/068* (2013.01); *H02M 1/14* (2013.01); *H02M 7/2176* (2013.01); *H02M 2001/007* (2013.01)

(58) Field of Classification Search
CPC   H02M 5/10–5/18; H02M 7/06; H02M 7/064; H02M 7/08; H02M 7/068; H02M 7/2176
See application file for complete search history.

(56) References Cited

U.S. PATENT DOCUMENTS 6,297,617 B1 * 10/2001 Aoyama .................. H02J 7/022
320/127
2003/0214271 A1 * 11/2003 Bradley .............. H02M 3/1582
323/222
(Continued)

OTHER PUBLICATIONS

G. R. Karnath, D. Benson and R. Wood, "A novel autotransformer based 18-pulse rectifier circuit," Applied Power Electronics Conference and Exposition, 2002. APEC 2002. Seventeenth Annual IEEE, Dallas, TX, 2002, pp. 795-801 vol. 2.*

Primary Examiner — Harry Behm
Assistant Examiner — Peter Novak
(74) Attorney, Agent, or Firm — Ming Chow; Sinorica, LLC

(57) ABSTRACT

A non-isolated symmetric self-coupling 18-pulse rectifier power supply system comprises a phase-shifting autotransformer, three circuits of output devices, a time sequence controller and a power output end. The phase-shifting autotransformer is provided with three groups of output ends and one group of input ends, and the output device in each circuit comprises a zero-sequence suppression reversing inductor, a three-phase uncontrolled rectifier bridge and a bidirectional switch BUCK converter, which are connected to each other in turn. The time sequence controller is provided with three groups of control ends which are respectively connected to the control end of the bidirectional switch BUCK converter
(Continued)

A Phase pillar   B Phase pillar   C Phase pillar in each circuit. The output end of the bidirectional switch buck converter in each circuit is connected to the power output end.

2 Claims, 2 Drawing Sheets

(51) Int. Cl.
*H02M 7/217* (2006.01)
*H02M 1/00* (2006.01)

(56) References Cited

U.S. PATENT DOCUMENTS

2009/0108677 A1* 4/2009 Walter ............... H02M 3/1582
  307/80
2013/0020989 A1* 1/2013 Xia .................... H02M 7/2176
  320/109

* cited by examiner

A Phase pillar    B Phase pillar    C Phase pillar

NON-ISOLATED SYMMETRIC SELF-COUPLING 18-PULSE RECTIFIER POWER SUPPLY SYSTEM

FIELD OF THE INVENTION

The present invention belongs to the technical field of power supplies, particularly relates to the technical field of high-power-frequency rectifier power supplies, and specifically refers to a non-isolated symmetric self-coupling 18-pulse rectifier power supply system without a balancing reactor.

BACKGROUND OF THE INVENTION

The global construction of industrialization and informatization raises a high demand on the AC-DC rectifier power supplies. In the field of high-medium power, with the advantages of strong adaptability, high reliability, strong shock resistance and load capacity, the power-frequency AC-DC rectifier power supplies have been widely applied to various industries. However, large grid-side current harmonic of the power-frequency AC-DC rectifier power supplies results in very serious pollution to the power grid. Furthermore, the current high-power power-frequency AC-DC rectifier can meet the requirements of use of the power grid only when configured with devices related to power grid compensation.

In order to solve the problem of power harmonic pollution resulted by rectification on the input side of the traditional high-power power-frequency AC-DC rectifiers, high-power systems generally employ a structure formed of a full-isolated phase-shifting transformer based on "Δ/Y and Δ/Δ type" and an additionally balancing reactor. The 12-pulse rectifier technology is achieved by two traditional 6-pulse phase-controlled rectifiers with a phase shift of 30 degrees, thereby suppressing 5 and 7 harmonics generated by a three-phase six-pulse rectifier. However, this manner has problems that the isolated phase-shifting transformer is bulky, heavy and high in cost, and is not convenient for the extension of the higher power AC-DC rectifier system.

SUMMARY OF THE INVENTION

An object of the present invention is to solve deficiencies of the prior art, and provide a non-isolated symmetric self-coupling 18-pulse rectifier power supply system, which has strong adaptability, high reliability, strong shock resistance and load capacity, and compact structure.

To achieve the above object, the present invention employs the following technical solutions.

A non-isolated symmetric self-coupling 18-pulse rectifier power supply system is provided, including a phase-shifting autotransformer, three circuits of output devices, a time sequence controller and a power output end. The phase-shifting autotransformer is provided with three groups of output ends and one group of input ends A, B and C. The three groups of output ends are: output ends A1, B1 and C1 in a leading group, output ends A0, B0 and C0 in an original group, and output ends A2, B2 and C2 in a lagging group, respectively. The three circuits of output devices are: an output device in the leading group, an output device in the original group and an output device in the lagging group, respectively. The output device in the leading group includes a zero-sequence suppression reversing inductor in the leading group, a three-phase uncontrolled rectifier bridge in the leading group and a bidirectional switch BUCK converter in the leading group, which are connected to each other in turn; the output device in the original group includes a zero-sequence suppression reversing inductor in the original group, a three-phase uncontrolled rectifier bridge in the original group and a bidirectional switch BUCK converter in the original group, which are connected to each other in turn; and the output device in the lagging group includes a zero-sequence suppression reversing inductor in the lagging group, a three-phase uncontrolled rectifier bridge the lagging group and a bidirectional switch BUCK converter in the lagging group, which are connected to each other in turn. The time sequence controller is provided with three groups of control ends which are respectively connected to the control end of the bidirectional switch BUCK converter in the leading group, the control end of the bidirectional switch BUCK converter in the original group and the control end of the bidirectional switch BUCK converter in the lagging group. The output end of the bidirectional switch BUCK converter in the leading group, the output end of the bidirectional switch BUCK converter in the original group and the output end of the bidirectional switch BUCK converter in the lagging group are all connected to the power output end.

Further, the non-isolated symmetric self-coupling 18-pulse rectifier power supply system further includes an energy storage device including a storage battery set. Positive and negative ends of the storage battery set are connected to the two output ends of the bidirectional switch BUCK converter in the leading group, the two output ends of the bidirectional switch BUCK converter in the original group and the two output ends of the bidirectional switch BUCK converter in the lagging group, respectively and correspondingly.

Further, the output device in the leading group further includes a rectifier filter capacitor in a leading group connected between the three-phase uncontrolled rectifier bridge in the leading group and the bidirectional switch BUCK converter in the leading group; the output device in the original group further includes a rectifier filter capacitor in an original group connected between the three-phase uncontrolled rectifier bridge in the original group and the bidirectional switch BUCK converter in the original group; and the lagging group of output devices further includes a rectifier filter capacitor in a lagging group connected between the three-phase uncontrolled rectifier bridge in the lagging group and the bidirectional switch BUCK converter in the lagging group.

Further, the circuit of the bidirectional switch BUCK converter in the leading group, the circuit of the bidirectional switch BUCK converter in the original group and the circuit of the bidirectional switch BUCK converter in the lagging group are all bidirectional switch BUCK converter circuits of a same structure, and the outputs of these bidirectional switch BUCK converters are connected in parallel. The bidirectional switch BUCK converter circuit includes a bidirectional fully-controlled switch and a filtering and freewheeling circuit. The bidirectional fully-controlled switch is provided with a control end; the bidirectional fully-controlled switch is provided with two output ends which are respectively connected to the two output ends of the filtering and freewheeling circuit; and the bidirectional fully-controlled switch is provided with two input ends, i.e., a positive input end and a negative input end, respectively. The bidirectional fully-controlled switch consists of two switch circuits of a same structure, and each switch circuit includes two insulated gate bipolar transistors and two diodes. Both grids of the two insulated gate bipolar transistors are connected to the control end of the bidirectional fully-controlled switch, and emitters of the two insulated gate bipolar transistors are connected to each other and connected to the positive electrodes of the two diodes, and the negative electrodes of the two diodes are respectively connected to collectors of the two insulated gate bipolar transistors. The negative electrodes of the two diodes of each switch circuit are further connected to one input end and one output end of the bidirectional fully-controlled switch, respectively. The filtering and freewheeling circuit includes one diode, two inductors and one capacitor, and positive and negative electrodes of the diode of the filtering and freewheeling circuit are respectively connected to a negative output end and a positive output end of the bidirectional fully-controlled switch. The two ends of one of the two inductors are respectively connected to the negative output end of the bidirectional fully-controlled switch and the negative electrode of the capacitor, and the two ends of the other inductor are respectively connected to the positive output end of the bidirectional fully-controlled switch and the positive electrode of the capacitor. The positive and negative electrodes of the capacitor are respectively connected to the two output ends of the filtering and freewheeling circuit.

Further, the filtering and freewheeling circuit further includes an auxiliary circuit disposed between the capacitor and the output end of the filtering and freewheeling circuit. The auxiliary circuit includes two auxiliary inductors and one auxiliary capacitor. The two ends of one of the two auxiliary inductors are respectively connected to the positive electrode of the capacitor and the positive electrode of the auxiliary capacitor, and the two ends of the other auxiliary inductor are respectively connected to the negative electrode of the capacitor and the negative electrode of the auxiliary capacitor; and positive and negative electrodes of the auxiliary capacitor are respectively connected to the two output ends of the filtering and freewheeling circuit.

The control end of the bidirectional fully-controlled switch in each circuit corresponds to the control end of the bidirectional switch BUCK converter in the leading group, the control end of the bidirectional switch BUCK converter in the original group and the control end of the bidirectional switch BUCK converter in the lagging group, respectively. The input end of the bidirectional fully-controlled switch in each circuit corresponds to the input end of the bidirectional switch BUCK converter in the leading group, the input end of the bidirectional switch BUCK converter in the original group and the input end of the bidirectional switch BUCK converter in the lagging group, respectively. The output end of the filtering and freewheeling circuit in each circuit corresponds to the output end of the bidirectional switch BUCK converter in the leading group, the output end of the bidirectional switch BUCK converter in the original group and the output end of the bidirectional switch BUCK converter in the lagging group, respectively.

Through the above technique, the present invention has the following advantages.

1. Under normal circumstances of mains supply, the phase-shifting autotransformer carries out phase-shift on the input three-phase AC power supplies to form three groups of symmetric three-phase AC power supplies with a corresponding phase difference of 20 degrees in turn. The three groups of three-phase AC power supplies output through the output ends in the leading group, the output ends in the original group and the output ends in the lagging group in turn. The three groups of symmetric three-phase AC power supplies with a phase-shift of 20 degrees are respectively rectified by the three-phase uncontrolled rectifier bridge in each circuit to output three circuits of independent 6-pulse voltages which are respectively supplied to respective channels in the subsequent groups. The three circuits of output devices output independently from each other, thereby achieving high redundancy and improved system stability.

2. The bidirectional switch BUCK converters are combined with time sequence controllers. The time sequence controllers carry out time-sharing control to power output of the bidirectional switch BUCK converter in each circuit, so that the power output of each circuit is combined with each other without interval to be output through the power output end. The traditional power-frequency balancing reactor has large volume, high cost and low economic benefit. In the present invention, after the power-frequency balancing reactor is removed, the bidirectional switch BUCK converters of a special design enable each DC channel that rectifies the output to achieve the output power synthesis. The BUCK converter in each group carries out time-sharing control, and only one rectifier DC channel transmits power to the output at one moment.

3. The outputs of the bidirectional switch BUCK converters in multi-input channels are connected to topology and time-sharing control strategy in parallel. The topological idea and the control strategy may be summarized as "one of many". The bidirectional switch is in full on-off control mode, thereby ensuring to turn off isolation of the channels. The bidirectional switch BUCK converter in each channel is turned on in time-sharing mode, and only one bidirectional switch BUCK converter is in the ON state at one time, thereby equivalently achieving the purpose of multi-channel multi-port input to single-port output.

4. While greatly reducing the capacity of the phase-shifting transformer, the topological structure of the system achieves "18-pulse rectification", effectively suppresses 5, 7, 11 and 13 harmonics of the grid-side input current harmonic of the AC-DC rectifier, and effectively reduces 17 and 19 harmonic contents. Meanwhile, this structure is convenient for the extension and modular design of the power unit of the wide-range high/medium-power AC-DC rectifier power supplies.

5. The present invention provides a new platform technique for research & development and manufacture of higher-power power-frequency AC-DC rectifier power supply products.

DETAILED DESCRIPTION OF THE PREFERRED EMBODIMENTS

The present invention will be further described in details as below with reference to the drawings by specific embodiments.

Embodiment

Figure 1:
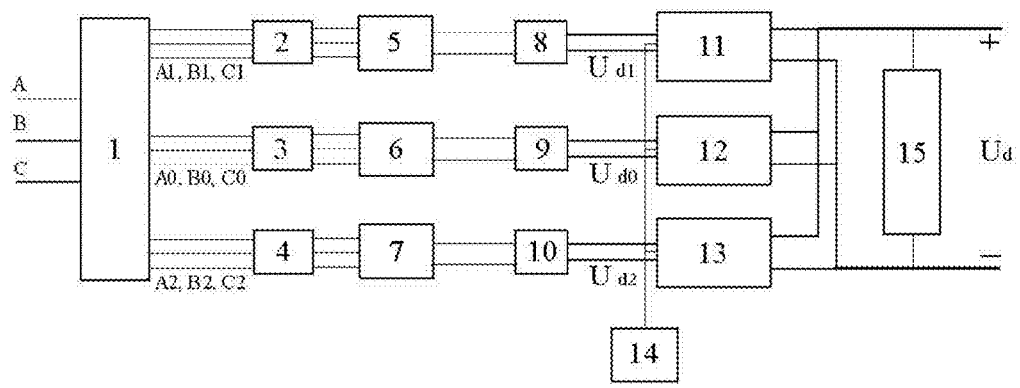
FIG. 1 is a block diagram of the present invention.
Figure 2:
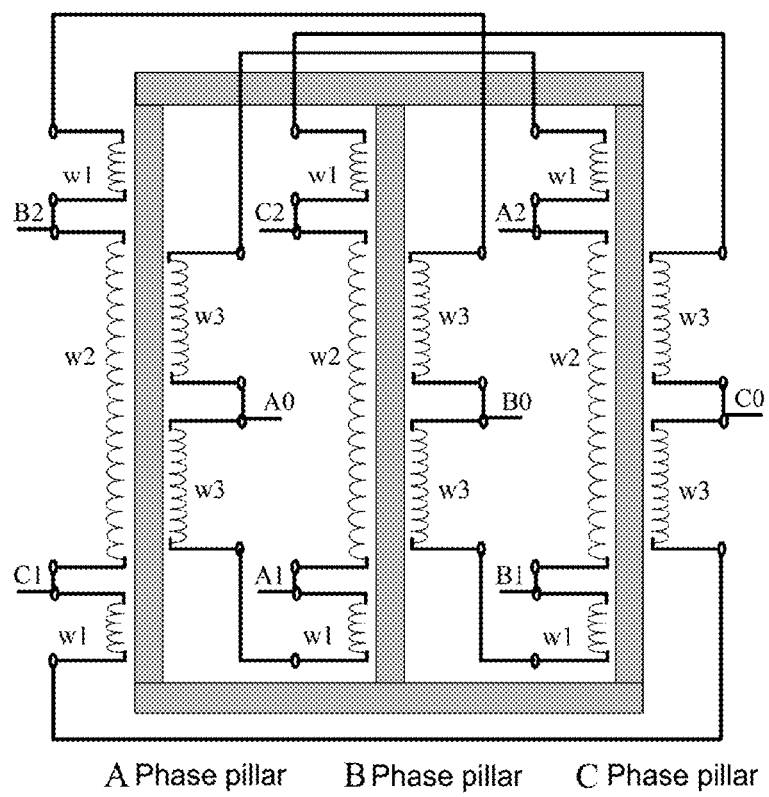
FIG. 2 is a structure diagram of a winding of a phase-shifting autotransformer according to the present invention.
Figure 3:
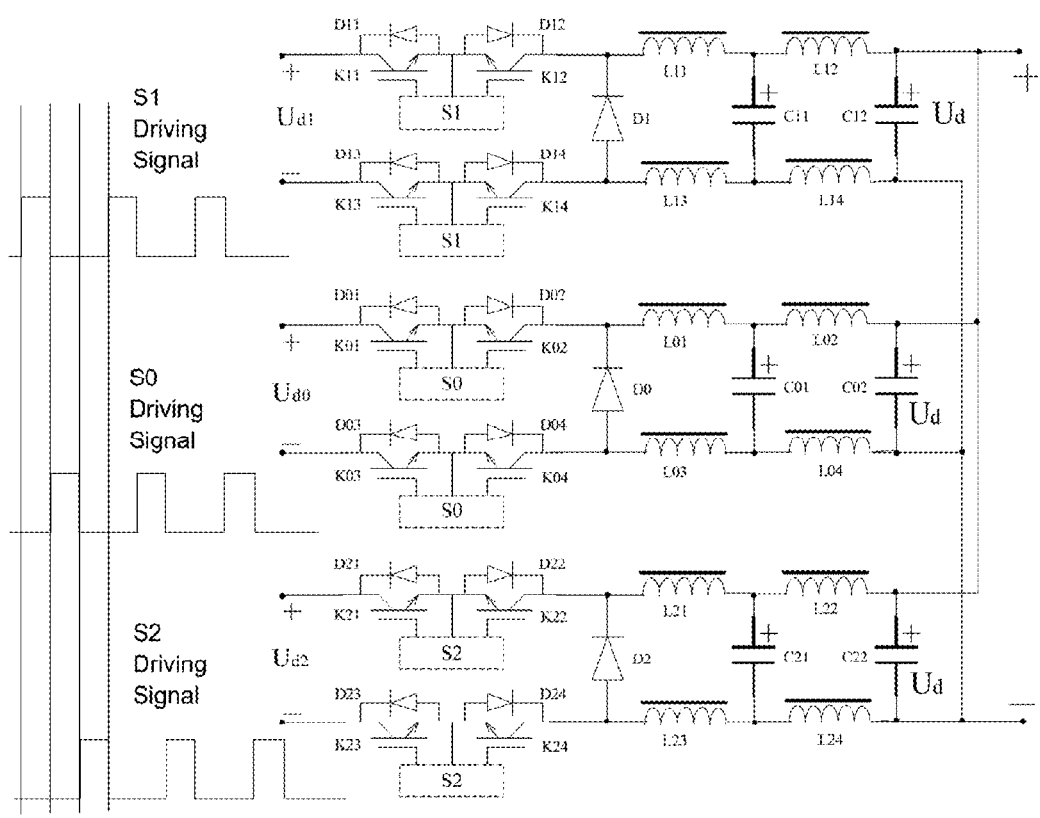
FIG. 3 is a schematic circuit diagram of a bidirectional switch BUCK converter according to the present invention.

As illustrated in FIGS. 1-3, a non-isolated symmetric self-coupling 18-pulse rectifier power supply system is provided, including a phase-shifting autotransformer 1, three circuits of output devices, a time sequence controller 14 and a power output end. The phase-shifting autotransformer 1 is provided with three groups of output ends and one group of input ends A, B and C. The three groups of output ends are: output ends A1, B1 and C1 in a leading group, output ends A0, B0 and C0 in an original group, and output ends A2, B2 and C2 in a lagging group, respectively. The three circuits of output devices are: an output device in the leading group, an output device in the original group and an output device in the lagging group, respectively. The output device in the leading group includes a zero-sequence suppression reversing inductor 2 in the leading group, a three-phase uncontrolled rectifier bridge 5 in the leading group and a bidirectional switch BUCK converter 11 in the leading group, which are connected to each other in turn; the output device in the original group includes a zero-sequence suppression reversing inductor 3 in the original group, a three-phase uncontrolled rectifier bridge 6 in the original group and a bidirectional switch BUCK converter 12 in the original group, which are connected to each other in turn; and the output device in the lagging group includes a zero-sequence suppression reversing inductor 4 in the lagging group, a three-phase uncontrolled rectifier bridge 7 in the lagging group and a bidirectional switch BUCK converter 13 in the lagging group, which are connected to each other in turn. The time sequence controller 14 is provided with three groups of control ends which are respectively connected to the control end of the bidirectional switch BUCK converter 11 in the leading group, the control end of the bidirectional switch BUCK converter 12 in the original group and the control end of the bidirectional switch BUCK converter 13 in the lagging group. The output end of the bidirectional switch BUCK converter 11 in the leading group, the output end of the bidirectional switch BUCK converter 12 in the original group and the output end of the bidirectional switch BUCK converter 13 in the lagging group are all connected to the power output end.

The phase-shifting autotransformer 1 carries out phase-shift to the input three-phase AC power supplies (A, B and C) to form three groups of symmetric three-phase AC power supplies with a corresponding phase difference of 20 degrees, i.e. three-phase AC power supplies (A0, B0 and C0) in the original group, three-phase AC power supplies (A1, B1 and C1) in the leading group, and three-phase AC power supplies (A2, B2 and C2) in the lagging group, respectively. The phase of the three-phase AC power supplies (A0, B0 and C0) in the original group is the same as that of the input three-phase AC power supplies (A, B and C), the phase of the three-phase AC power supplies (A1, B1 and C1) in the leading group leads that of the three-phase AC power supplies (A0, B0 and C0) in the original group by 20 degrees, and the phase of the three-phase AC power supplies (A2, B2 and C2) in the lagging group lags that of the three-phase AC power supplies (A0, B0 and C0) in the original group by 20 degrees.

In FIG. 1, signals of the three-phase AC power supplies (A0, B0 and C0) in the original group, the three-phase AC power supplies (A1, B1 and C1) in the leading group and the three-phase AC power supplies (A2, B2 and C2) in the lagging group respectively pass through the three-phase uncontrolled rectifier bridge in each circuit to undergo 6-pulse rectification, and are finally input to the respective bidirectional switch BUCK converter to obtain DC output, thereby further achieving parallel connection and power synthesis. The zero-sequence suppression reversing inductors of the three circuits of output devices play a role of suppressing zero-sequence current in each circuit (referring to 2, 3 and 4 in FIG. 1), and being beneficial to reversing current among the bridges of the three-phase uncontrolled rectifier bridge in each circuit.

In FIG. 2, the three-phase AC power supplies (A0, B0 and C0) in the original group are inputs of the phase-shifting autotransformer 1 body and are connected to a 380V three-phase AC power supply of the mains supply. In FIG. 2, the three-phase AC power supplies (A1, B1 and C1) in the leading group and the three-phase AC power supplies (A2, B2 and C2) in the lagging group are two groups of three-phase AC outputs, respectively. The phase of the three-phase AC power supplies (A1, B1 and C1) in the leading group leads that of the three-phase AC power supplies (A0, B0 and C0) in the original group by 20 degrees, and the phase of the three-phase AC power supplies (A2, B2 and C2) in the lagging group lags that of the three-phase AC power supplies (A0, B0 and C0) in the original group by 20 degrees. During normal operation, the three-phase AC power supplies (A0, B0 and C0) in the original group of the transformer body are connected to the three phases of grid voltages (A, B, C). In this way, the power capacity of the phase-shift autotransformer body will not exceed 20% of the total output power of the system while achieving 18-pulse rectification, and both the structure and weight of the transformer body are greatly smaller than those of the conventional isolated power-frequency phase-shifting transformers.

Further, the non-isolated symmetric self-coupling 18-pulse rectifier power supply system further includes an energy storage device including a storage battery set 15. Positive and negative ends of the storage battery set 15 are connected to the positive and negative electrodes of the output end of the bidirectional switch BUCK converter 11 in the leading group, the positive and negative electrodes of the output end of the bidirectional switch BUCK converter 12 in the original group and the positive and negative electrodes of the output end of the bidirectional switch BUCK converter 13 in the lagging group, respectively and correspondingly. After the energy storage device is configured, the bidirectional switch BUCK converter in each channel will enter an OFF state once the mains supply is in power failure. The storage battery set 15 can directly supply DC electric energy.

By an appropriate control algorithm, the bidirectional switch BUCK converters have a charge control function to the storage battery set 15 without influencing the time-sharing control function.

Further, the output device in the leading group further includes a rectifier filter capacitor 8 in a leading group connected between the three-phase uncontrolled rectifier bridge 5 in the leading group and the bidirectional switch BUCK converter 11 in the leading group; the output device in the original group further includes a rectifier filter capacitor 9 in an original group connected between the three-phase uncontrolled rectifier bridge 6 in the original group and the bidirectional switch BUCK converter 12 in the original group; and the lagging group of output devices further includes a rectifier filter capacitor 10 in a lagging group connected between the three-phase uncontrolled rectifier bridge 7 in the lagging group and the bidirectional switch BUCK converter 13 in the lagging group.

The three circuits of output devices are provided with rectifier filter capacitors respectively, thereby achieving effects of filtering and stabilizing the intermediate DC voltage.

Further, the circuit of the bidirectional switch BUCK converter 11 in the leading group, the circuit of the bidirectional switch BUCK converter 12 in the original group and the circuit of the bidirectional switch BUCK converter 13 in the lagging group are all bidirectional switch BUCK converter circuits of a same structure, and the outputs of these bidirectional switch BUCK converters are connected in parallel. The bidirectional switch BUCK converter circuit includes a bidirectional fully-controlled switch and a filtering and freewheeling circuit. The bidirectional fully-controlled switch is provided with a control end; the bidirectional fully-controlled switch is provided with two output ends which are respectively connected to the two output ends of the filtering and freewheeling circuit; and the bidirectional fully-controlled switch is provided with two input ends, i.e., a positive input end and a negative input end, respectively. The bidirectional fully-controlled switch consists of two switch circuits of a same structure, and each switch circuit includes two insulated gate bipolar transistors and two diodes. Both grids of the two insulated gate bipolar transistors are connected to the control end of the bidirectional fully-controlled switch, and emitters of the two insulated gate bipolar transistors are connected to each other and connected to the positive electrodes of the two diodes, and the negative electrodes of the two diodes are respectively connected to collectors of the two insulated gate bipolar transistors. The negative electrodes of the two diodes of each switch circuit are further connected to one input end and one output end of the bidirectional fully-controlled switch, respectively. The filtering and freewheeling circuit includes one diode, two inductors and one capacitor, and positive and negative electrodes of the diode of the filtering and freewheeling circuit are respectively connected to a negative output end and a positive output end of the bidirectional fully-controlled switch, wherein the two ends of one inductor are respectively connected to the negative output end of the bidirectional fully-controlled switch and the negative electrode of the capacitor, and the two ends of the other inductor are respectively connected to the positive output end of the bidirectional fully-controlled switch and the positive electrode of the capacitor. The positive and negative electrodes of the capacitor are respectively connected to the two output ends of the filtering and freewheeling circuit.

A schematic circuit diagram of control of a bidirectional switch BUCK converter in each circuit according to the present invention is as illustrated in FIG. 3. The function of this part is to achieve parallel connection and power synthesis output of the DC channels. In FIG. 3, S1, S0 and S2 are co-frequency high-frequency pulse driving signals having a duty cycle less than 33.3%, which are sent by the time sequence controller 14, and the phase thereof lags each other by ⅓ cycle in turn. The waveform diagram is as illustrated in the left part of FIG. 3. The driving signals drive on or off of the bidirectional fully-controlled switch. For example, in FIG. 3, (K11, D11; K12, D12) relates to a fully-controlled switch represented by IGBTs and anti-parallel diodes, and similar bidirectional switches with a bidirectional fully-controlled function may also be achieved by other techniques. The illustration of other bidirectional switches in FIG. 3 is the same as the use of (K12, D12, K11, D11). As illustrated in FIG. 3 of the present invention, all positive and negative DC circuits of the parallel DC channels need to be configured with bidirectional switches with a fully-controlled function. In this way, it may ensure the isolation between parallel channels during the operating of the whole system. This is also a safeguard to ensure the balanced running of the three groups of three-phase rectifier channels of 18-pulse rectifier.

Further, the filtering and freewheeling circuit further includes an auxiliary circuit disposed between the output ends of the capacitor and the filtering and freewheeling circuit. The auxiliary circuit includes two auxiliary inductors and one auxiliary capacitor, wherein the two ends of one auxiliary inductor are respectively connected to the positive electrode of the capacitor and the positive electrode of the auxiliary capacitor, and the two ends of the other auxiliary inductor are respectively connected to the negative electrode of the capacitor and the negative electrode of the auxiliary capacitor; and positive and negative electrodes of the auxiliary capacitor are respectively connected to the two output ends of the filtering and freewheeling circuit.

The filtering and freewheeling loops of the filtering and freewheeling circuit in each channel are as illustrated in FIG. 3, taking the input Ud1 channels (D1, L11, C11, L13; L12, C12, L14) as an example. The inductor is designed according to the requirements of driving pulse frequency and output power. The inductors, as indispensable parts for filtering, have some functions of "traditional balancing reactor" during the reversing in each channel. Therefore, all inductors (L11, L13; L12, L14) on the positive and negative mains are required. Depending on specific circumstances, the number of the auxiliary circuits in the channels (L12, C12, L14) may be increased or decreased to meet the quality requirements of the waveform.

The above descriptions are merely preferred embodiments of the present application, and the equivalent technical solutions on this basis shall fall into the protection scope of the application.

What is claimed is:
1. A non-isolated symmetric self-coupling 18-pulse rectifier power supply system comprising:
a phase-shifting autotransformer;
three circuits of output devices;
a time sequence controller;
a power output end;
the phase-shifting autotransformer provided with three groups of output ends and one group of input ends A, B and C, the three groups of output ends being output ends A1, B1 and C1 in a leading group, output ends A0, B0 and C0 in an original group, and output ends A2, B2 and C2 in a lagging group, respectively;
the three circuits of output devices being an output device in the leading group, an output device in the original group and an output device in the lagging group, respectively;
the output device in the leading group including a zero-sequence suppression reversing inductor in the leading group, a three-phase uncontrolled rectifier bridge in the leading group and a bidirectional switch BUCK converter in the leading group, which are connected to each other in turn;
the output device in the original group including a zero-sequence suppression reversing inductor in the original group, a three-phase uncontrolled rectifier bridge in the original group and a bidirectional switch BUCK converter in the original group, which are connected to each other in turn;
the output device in the lagging group including a zero-sequence suppression reversing inductor in the lagging group, a three-phase uncontrolled rectifier bridge the lagging group and a bidirectional switch BUCK converter in the lagging group, which are connected to each other in turn;
the time sequence controller provided with three groups of control ends which are respectively connected to the control end of the bidirectional switch BUCK converter in the leading group, the control end of the bidirectional switch BUCK converter in the original group and the control end of the bidirectional switch BUCK converter in the lagging group;

the output end of the bidirectional switch BUCK converter in the leading group, the output end of the bidirectional switch BUCK converter in the original group and the output end of the bidirectional switch BUCK converter in the lagging group being all connected to the power output end;

an energy storage device;

the energy storage device including a storage battery set, positive and negative ends of the storage battery set being connected to the two output ends of the bidirectional switch BUCK converter in the leading group, the two output ends of the bidirectional switch BUCK converter in the original group and the two output ends of the bidirectional switch BUCK converter in the lagging group, respectively and correspondingly;

the output device in the leading group further includes a rectifier filter capacitor in a leading group connected between the three-phase uncontrolled rectifier bridge in the leading group and the bidirectional switch BUCK converter in the leading group; the output device in the original group further includes a rectifier filter capacitor in an original group connected between the three-phase uncontrolled rectifier bridge in the original group and the bidirectional switch BUCK converter in the original group; and the lagging group of output devices further includes a rectifier filter capacitor in a lagging group connected between the three-phase uncontrolled rectifier bridge in the lagging group and the bidirectional switch BUCK converter in the lagging group;

the circuit of the bidirectional switch BUCK converter in the leading group, the circuit of the bidirectional switch BUCK converter in the original group and the circuit of the bidirectional switch BUCK converter in the lagging group being all bidirectional switch BUCK converter circuits of a same structure;

the outputs of these bidirectional switch BUCK converters being connected in parallel;

the bidirectional switch BUCK converter circuit including a bidirectional fully-controlled switch and a filtering and freewheeling circuit;

the bidirectional fully-controlled switch being provided with a control end;

the bidirectional fully-controlled switch being provided with two output ends which are respectively connected to the two output ends of the filtering and freewheeling circuit;

the bidirectional fully-controlled switch being provided with two input ends, i.e., a positive input end and a negative input end, respectively;

the bidirectional fully-controlled switch being consisting of two switch circuits of a same structure;

each switch circuit including two insulated gate bipolar transistors and two diodes;

both grids of the two insulated gate bipolar transistors being connected to the control end of the bidirectional fully-controlled switch;

emitters of the two insulated gate bipolar transistors being connected to each other and connected to the positive electrodes of the two diodes;

the negative electrodes of the two diodes being respectively connected to collectors of the two insulated gate bipolar transistors;

the negative electrodes of the two diodes of each switch circuit being further connected to one input end and one output end of the bidirectional fully-controlled switch, respectively;

the filtering and freewheeling circuit including one diode, two inductors and one capacitor;

positive and negative electrodes of the diode of the filtering and freewheeling circuit being respectively connected to a negative output end and a positive output end of the bidirectional fully-controlled switch;

the two ends of one of the two inductors being respectively connected to the negative output end of the bidirectional fully-controlled switch and the negative electrode of the capacitor;

the two ends of the other inductor being respectively connected to the positive output end of the bidirectional fully-controlled switch and the positive electrode of the capacitor; and the positive and negative electrodes of the capacitor being respectively connected to the two output ends of the filtering and freewheeling circuit.

2. The non-isolated symmetric self-coupling 18-pulse rectifier power supply system according to claim 1 further comprising:

the filtering and freewheeling circuit further including an auxiliary circuit disposed between the capacitor and the output end of the filtering and freewheeling circuit;

the auxiliary circuit including two auxiliary inductors and one auxiliary capacitor;

the two ends of one of the two auxiliary inductors being respectively connected to the positive electrode of the capacitor and the positive electrode of the auxiliary capacitor the two ends of the other auxiliary inductor being respectively connected to the negative electrode of the capacitor and the negative electrode of the auxiliary capacitor; and positive and negative electrodes of the auxiliary capacitor being respectively connected to the two output ends of the filtering and freewheeling circuit.

* * * * *